(12) United States Patent  (10) Patent No.: US 8,257,858 B2
Kashiwagi  (45) Date of Patent: Sep. 4, 2012

(54) LITHIUM ION SECONDARY BATTERY AND METHOD FOR FORMING NEGATIVE ELECTRODE PLATE FOR LITHIUM ION SECONDARY BATTERY

(75) Inventor: Katsumi Kashiwagi, Nara (JP)

(73) Assignee: Panasonic Corporation, Osaka (JP)

( * ) Notice: Subject to any disclaimer, the term of this patent is extended or adjusted under 35 U.S.C. 154(b) by 1253 days.

(21) Appl. No.: 11/976,495

(22) Filed: Oct. 25, 2007

(65) Prior Publication Data

US 2008/0102370 A1    May 1, 2008

(30) Foreign Application Priority Data

Nov. 1, 2006  (JP) .................................. 2006-298008

(51) Int. Cl.
  *H01M 6/00*  (2006.01)
  *H01M 2/14*  (2006.01)
  *H01M 2/16*  (2006.01)
  *H01M 2/18*  (2006.01)
(52) U.S. Cl. .................... 429/146; 429/122; 429/129
(58) Field of Classification Search .................... 429/146
  See application file for complete search history.

(56) References Cited

U.S. PATENT DOCUMENTS

| | | | | |
|---|---|---|---|---|
| 5,571,637 | A | * | 11/1996 | Idota .............................. 429/338 |
| 5,589,297 | A | * | 12/1996 | Koga et al. .................... 429/212 |
| 2002/0114993 | A1 | | 8/2002 | Miyaki et al. |
| 2004/0023116 | A1 | | 2/2004 | Fujino et al. |
| 2005/0058906 | A1 | | 3/2005 | Sugiyama et al. |
| 2006/0228629 | A1 | * | 10/2006 | Christian et al. ........... 429/231.1 |
| 2008/0020271 | A1 | | 1/2008 | Sato et al. |

FOREIGN PATENT DOCUMENTS

| | | |
|---|---|---|
| JP | 2002-15729 | 1/2002 |
| JP | 2002-75375 | 3/2002 |
| JP | 2002-279974 | * 9/2002 |
| JP | 2003-346907 | 12/2003 |
| JP | 2004-071463 | 3/2004 |
| JP | 2004-79370 | 3/2004 |
| JP | 2004-095264 | 3/2004 |
| JP | 2004-103474 | 4/2004 |
| JP | 2004-200003 | 7/2004 |
| JP | 2005-116519 | 4/2005 |
| JP | 2006-019309 | 1/2006 |
| JP | 2006-120445 | 5/2006 |
| WO | WO 97/01870 | 1/1997 |

* cited by examiner

*Primary Examiner* — Barbara Gilliam
*Assistant Examiner* — Steven Scully
(74) *Attorney, Agent, or Firm* — McDermott Will & Emery LLP

(57) ABSTRACT

An active material of silicon, tin or a compound containing silicon or tin is formed on a current collector of a negative electrode in form of a plurality of island regions so that the island regions are separated from one another. Furthermore, a conductive protective film is formed on the current collector so as to cover the island regions. The conductive protective film is formed so as to also cover exposed regions (space portions) of the current collector on which the island regions are not formed. Thus, expansion/shrink of the active region following charge/discharge can be absorbed by the conductive protective film formed in the space portions between the island regions. Also, adhesiveness of the active material with the current collector can be improved.

11 Claims, 4 Drawing Sheets

LITHIUM ION SECONDARY BATTERY AND METHOD FOR FORMING NEGATIVE ELECTRODE PLATE FOR LITHIUM ION SECONDARY BATTERY

BACKGROUND OF THE INVENTION

1. Field of the Invention The present invention relates to a high capacity lithium ion secondary battery and a method for forming a negative electrode plate for the lithium ion secondary battery.

2. Description of the Prior Art

In recent years, as more and more portable or cordless electronics devices have been used, more and more small-size and light-weight secondary batteries with high energy density have been put into practice as power sources for driving such electronics devices. Advances has been made in this field not only in application of such secondary batteries to small-size consumer products, but also in the development of large-size secondary batteries which are required to have long lasting resistance and safety. Specifically, lithium ion secondary batteries have high voltage and high energy density and thus are expected as one of power sources for not only electronics devices but also electrical power storage systems and electrical automobiles.

Under the above-described circumstances, instead of a carbon material such as graphite which has been widely used as a negative electrode active material of a lithium ion secondary battery in a conventional manner, an active material, for example, silicon (Si), tin (Sn) or a compound (for example, oxide, alloy or the like) of silicon or tin, having a larger theoretical capacity than that of graphite is used to advance development of increasing a capacity of a battery.

However, as for such an active material, its characteristic that it inserts/deinserts lithium when being alloyed with lithium is utilized and the volume of the active material expands/shrinks to a large extent due to charge/discharge. Accordingly, there has been a problem pointed out in which through repetition of expansion/shrink, the active material is micronized and lifetime of a charge/discharge cycle is reduced.

To cope with the problem, Japanese Laid-Open Publication No. 2006-019309 disclose a method in which an active material including silicon or the like is coated by ceramic, metal or the like to suppress micronization of the active material.

However, there are cases where when an active material is coated by ceramic (for example, Al2O3, SiO2 or the like), conductivity of the active material is reduced and thus properties of a battery (for example, high rate property) is degraded. When an active material is coated by metal (Ni, Cu and the like), the problem of reduction in conductivity does not arise but fabrication process steps become complicated because plating, vapor deposition, CVD (chemical vapor deposition) and the like has to be used as a coating method.

To cope with this, Patent Laid-Open Publication No. 2002-279974 discloses a method in which an active material is formed in form of islands on a current collector, thereby suppressing micronization of the active material due to expansion/shrink at charge/discharge.

FIG. 6 illustrates respective steps for forming a negative electrode plate described in Patent Laid-Open Publication No. 2002-279974. As shown in FIG. 6, for example, a target 104 of single-crystalline Si is provided over a current collector 101 and Si is vapor deposited over the current collector 101 through a mesh 103 to form an active material 102 in form of islands.

According to this method, expansion/shrink of the active material 102 can be absorbed in spaces between island regions, so that micronization of the active material 102 can be suppressed. Accordingly, a stress applied to the current collector 101 due to expansion/shrink of the active material 102 is also reduced. Thus, the generation of wrinkles in the current collector 101 can be prevented and reduction in energy density can be suppressed.

SUMMARY OF THE INVENTION

The method described in Patent Laid-Open Publication No. 2002-279974 in which an active material is formed in form of islands is certainly effective in suppressing micronization of the active material. However, the present inventor examined the method and reached the following findings. Specifically, it was found that when an active material is formed in form of islands on a current collector by "application" of a material of the active material, the high-rate property and the lifetime property might be degraded, compared to the case where a known active material of graphite is formed uniformly on a current collector. It was also found that when an active material is formed in form of islands on a current collector by "vacuum vapor deposition" of a material of the active material, there are cases where the lifetime property is degraded.

When negative electrode plates of batteries in which such degradation in properties occurred were examined, exfoliation of the active material from interfaces or parts of the active material chipped away were observed. From this observation, it should be considered that such property deterioration occurred because adhesiveness of the active material formed in form of islands with the current collector was insufficient.

In view of the above-described points, the present invention has been devised and it is therefore an object of the present invention to provide a large capacity lithium ion secondary battery with an excellent lifetime property of charge/discharge cycle.

As a lithium ion secondary battery according to the present invention, a structure in which an active material of a negative electrode is made of a material having a characteristic of alloying with lithium, and the active material is formed on a current collector of the negative electrode in form of a plurality of island regions so that the island regions are separated from one another and a conductive protective film is formed on the current collector so as to cover the plurality of island regions is adopted.

With the above-described structure, expansion/shrink of the active material following charge/discharge can be absorbed by the conductive protective film located in the spaces between the island regions and also adhesiveness of the active material with the current collector can be improved. Thus, degradation of lifetime property of a charge/discharge cycle can be suppressed.

In this case, it is preferable that the active material of the negative electrode is made of silicon, tin or a compound containing silicon or tin. Even such an active material with a large volume expansity is used, adhesiveness of the active material with the current collector can be ensured. Therefore, a lithium ion secondary battery with a larger capacity can be obtained.

The conductive protective film is preferably made of a film having an aggregation structure. Moreover, the conductive protective film is preferably made of conductive carbon black. Furthermore, the conductive protective film may include a binder.

By covering the active material with the conductive protective film having these characteristics, expansion and shrink of the active region can be reduced and also adhesiveness of the active material with the current collector can be improved. Thus, a more reliable lithium ion secondary battery can be achieved.

The active material is preferably formed on the current collector with a conductive adhesive film provided on the current collector and interposed between the active material and the current collector. Thus, adhesiveness of the active material with the current collector can be further improved.

A method for forming a negative electrode plate for a lithium ion secondary battery according to the present invention is characterized by comprising the steps of: a) forming on a current collector an active material made of a material having a characteristic of alloying with lithium in form of a plurality of island region so that the plurality of island regions are separated from one another; and b) forming a conductive protective film on the current collector so that the conductive protective film covers the island regions.

According to the method, a negative electrode plate in which active regions formed in form of islands on a current collector are covered by a conductive protective film can be formed in a simple manner. If a lithium ion secondary battery is produced using a negative electrode plate formed in this method, a lithium ion secondary battery with excellent lifetime property of a charge/discharge cycle can achieved.

In this case, in the step a), the island regions of the active material are preferably formed by applying a slurry containing the active material onto the current collector through gravure application. Accordingly, the active material in form of islands can be formed on the current collector in a simple manner.

DESCRIPTION OF THE PREFERRED EMBODIMENTS

Figure 1:
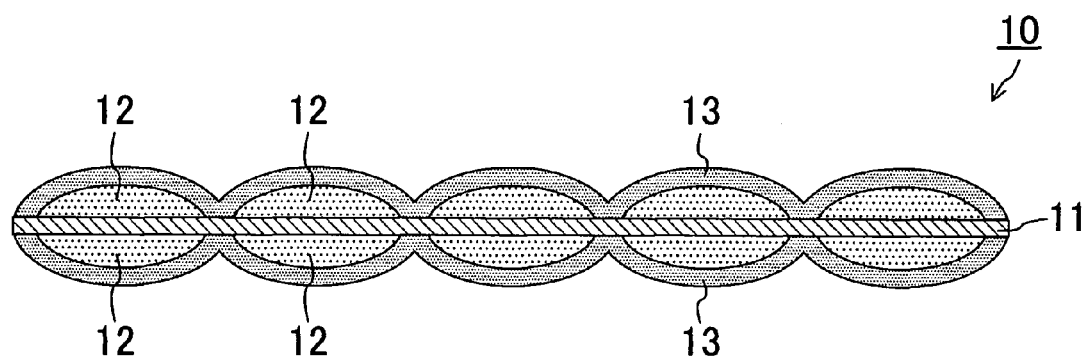
FIG. 1 is a cross-sectional view schematically illustrating a structure of a negative electrode plate a lithium ion secondary battery according to an embodiment of the present invention.

Hereafter, embodiments of the present invention will be described with reference to the accompanying drawings. In the accompanied drawings, components having substantially the same function are denoted by the same reference numeral for the purpose of simplicity. Note that the present invention is not limited to the following embodiments.

FIG. 1 is a cross-sectional view schematically illustrating a structure of a negative electrode plate 10 of a lithium ion secondary battery according to an embodiment of the present invention.

As shown in FIG. 1, an active material made of a material (for example, silicon or a compound containing silicon) having the characteristic of alloying with lithium is formed in form of a plurality of island regions 12 so that the island regions 12 are separated from one another. A conductive protective film 13 is formed on a current collector 11 so as to cover the island regions 12.

In this case, the conductive protective film 13 completely covers the island regions 12 of the active material and also covers exposed regions (space portions) of the current collector 11 on which the island regions 12 are not formed. Thus, expansion/shrink of the active material following charge/discharge can be absorbed by the conductive protective film 13 located in the spaces between the island regions 12 and also adhesiveness of the active material with the current collector 11 can be improved. As a result, a large capacity of lithium ion secondary battery with excellent lifetime property of a charge/discharge cycle can be achieved.

In this case, a negative active material may be any material having the characteristic of alloying with lithium and is not particularly limited. However, if silicon, tin which has a large capacity density, or a compound containing silicon or tin is used, a lithium ion secondary battery with larger capacity can be realized.

As a compound containing silicon, in addition to $SiO_x$ ($0.05<x<1.95$), an alloy, a compound or a solid solution obtained by replacing part of Si in Si or $SiO_2$ with at least one element selected from the group consisting of B, Mg, Ni, Ti, Mo, Co, Ca, Cr, Cu, Fe, Mn, Nb, Ta, V, W, Zn, C, N and Sn can be used. Moreover, as a compound containing tin, $Ni_2Sn_4$, $Mg_2Sn$, $SnO_x$ ($0<x<2$), $SnO_2$, $SnSiO_3$, LiSnO or the like can be used.

The conductive protective film 13 is preferably made of a film having an aggregation structure. A film having an aggregation structure is excellent in elasticity and exhibits furthermore the effect of reducing expansion/shrink of an active material following charge/discharge. As a film having an aggregation structure, for example, conductive carbon black can be used. As carbon black, furnace black, lamp black, ketjen black or the like can be used. Among them, acetylene black is more preferable in the view that acetylene black has a high aggregation structure and high conductivity.

With use of the conductive protective film 13 containing a binder, adhesiveness of the active material with the current collector 11 can be further improved. In this case, as a binder, for example, polyvinylidene fluoride (PVDF), polyacrylic acid, polypropylene or the like can be used.

Next, a method for forming the negative electrode plate 10 of FIG. 1 will be described with reference to cross-sectional views of FIGS. 2A through 2C.

Figure 2A:
FIGS. 2A through 2C are cross-sectional views illustrating respective steps for forming a negative electrode plate according to an embodiment of the present invention.

First, as shown in FIG. 2A, for example, a current collector 11, made of a copper foil, of a negative electrode plate 10 is prepared.

Figure 2B:
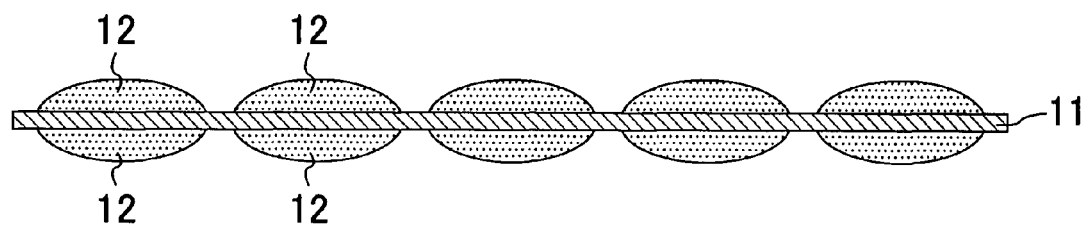

Next, as shown in FIG. 2B, for example, an active material made of silicon, tin or a compound containing silicon or tin is formed in form of a plurality of island regions 12 on the current collector 11 so that the island regions 12 are separated from one another. In this case, the island regions 12 of the active region can be formed, for example, by gravure application of a slurry containing the active material onto the current collector 11 and then drying up the current collector 11. Also, the island regions 12 may be formed by vacuum vapor deposition or sputtering using a mesh mask.

The island regions 12 are formed on both surfaces of the current collector 11 but patterns and arrangements of the island regions 12 on the both surfaces do not have to match each other. If silicon is used as the active material, for example, volume expansity of silicon is about three times larger than that of graphite. Therefore, if the occupation ratio of the island regions 12 on the current collector 11 is set to be 50% or more, more preferably, 70% or more, a battery with larger capacity can be achieved, compared to the case where graphite is formed uniformly on the current collector 11 having the same area.

Figure 2C:
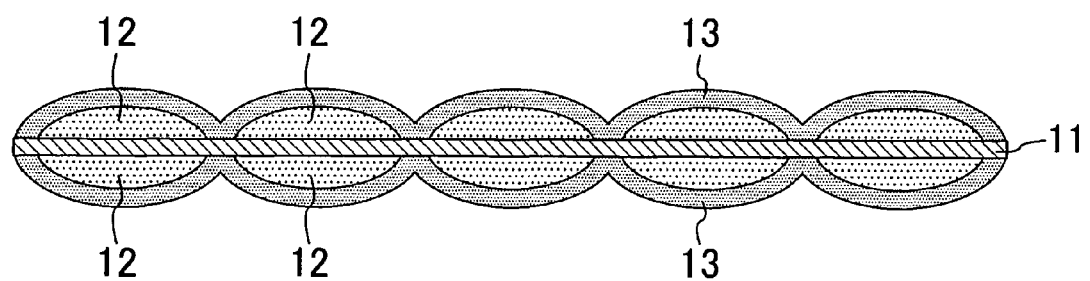

Lastly, as shown in FIG. 2C, for example, a conductive protective film 13 containing carbon black is formed on the current collector 11 so as to cover the island regions 12. In this case, the conductive protective film 13 completely covers the island regions 12 of the active material and also covers exposed regions (space portions) of the current collector 11 on which the island regions 12 are not formed.

Figure 3:
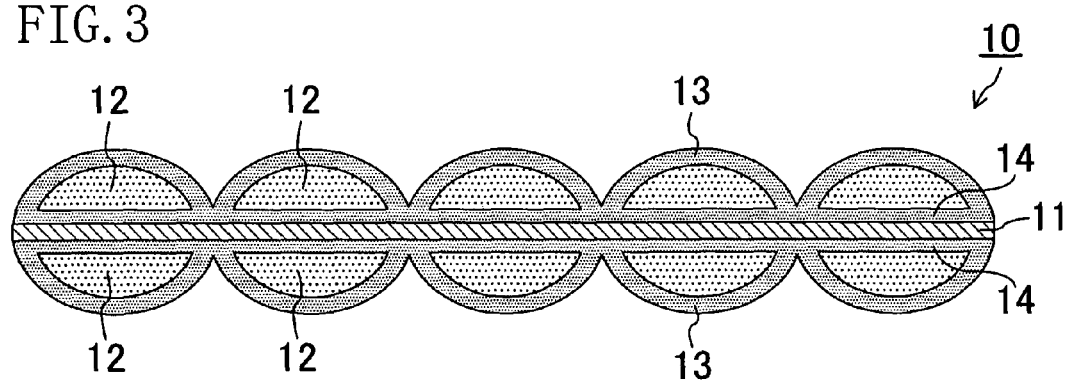
FIG. 3 is a cross-sectional view illustrating a structure of a negative electrode plate according to a modified example of the embodiment of the present invention.

FIG. 3 is a cross-sectional view illustrating a modified example of the negative electrode plate 10 of the lithium ion secondary battery according to this embodiment. The modified example is characterized in that the island regions 12 of the active material is formed with a conductive adhesive film 14 formed on the current collector 11 interposed between the current collector 11 and the island regions 12. With this structure, adhesiveness of the active material with the current collector 11 can be improved.

In this case, the conductive adhesive film 14 may be formed of the same material as a material of the conductive protective film 13. For example, conductive carbon black such as furnace black, lamp black, ketjen black, acetylene black or the like can be used.

FIGS. 4A through 4D are cross-sectional views illustrating steps for forming the negative electrode plate 10 of the lithium ion secondary battery of FIG. 3. In FIGS. 4A through 4D, the description of each step also shown in FIGS. 2A through 2C is omitted.

Figure 4A:
FIGS. 4A through 4D are cross-sectional views schematically illustrating respective steps for forming a negative electrode plate according to the modified example of the embodiment of the present invention.
Figure 4B:
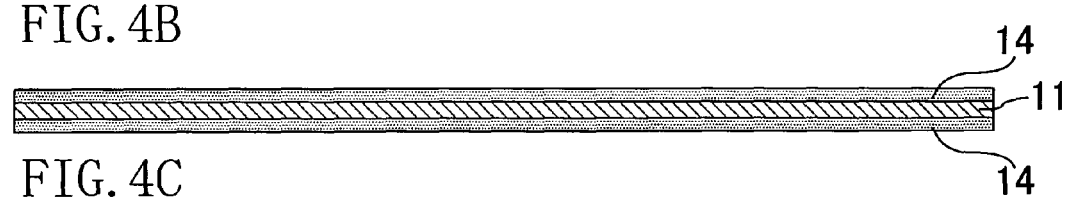

First, as shown in FIG. 4A, a current collector 11 of a negative electrode plate 10 is prepared. Thereafter, as shown in FIG. 4B, for example, a conductive adhesive film 14 containing carbon black is formed on both surfaces of the current collector 11. In this case, for example, the conductive adhesive film 14 can be formed by spraying-applying a slurry containing carbon black on the current collector 11.

Figure 4C:
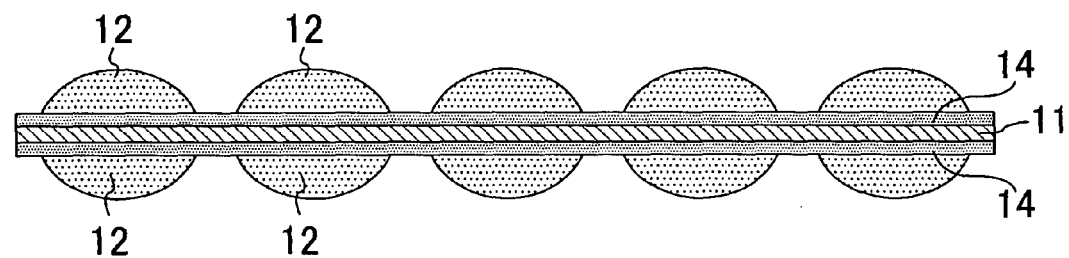

Next, as shown in FIG. 4C, for example, an active material made of silicon, tin or a compound containing silicon or tin is formed in form of a plurality of island regions 12 on the current collector 11 (the conductive adhesive film 14) so that the island regions 12 are separated from one another.

Figure 4D:
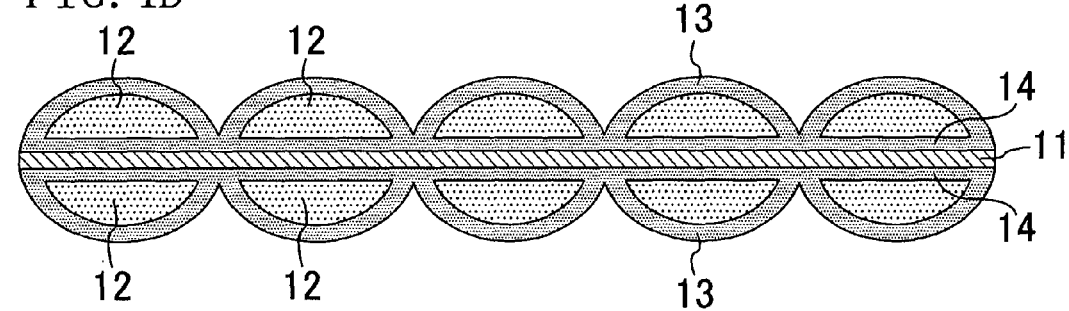

Lastly, as shown in FIG. 4D, for example, a conductive protective film 13 containing carbon black is formed on the current collector 11 so as to cover the island regions 12. In this case, the conductive protective film 13 completely covers the island regions 12 of the active material and also covers exposed regions (space portions) of the current collector 11 on which the island regions 12 are not formed.

Figure 5:
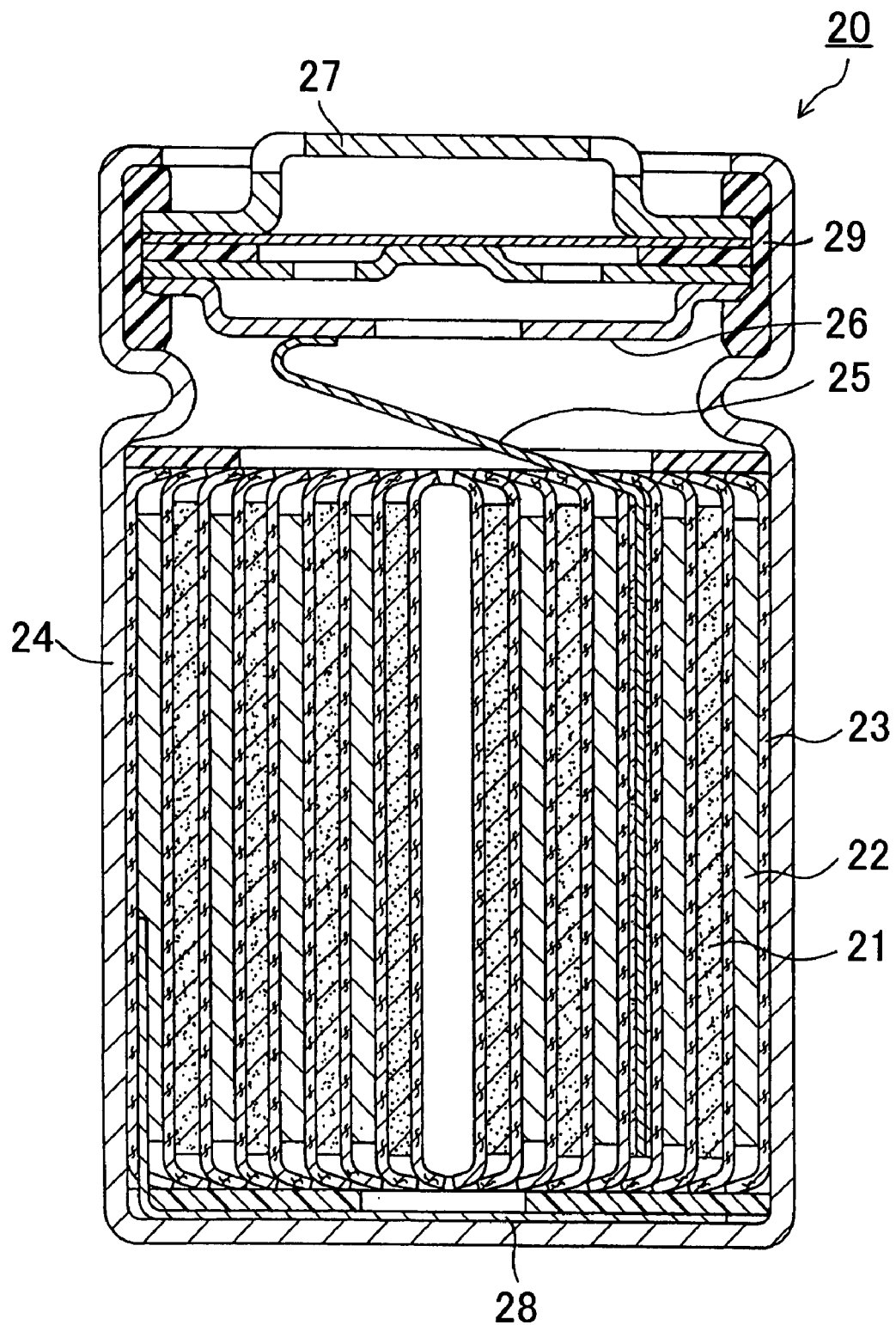
FIG. 5 is a cross-sectional view illustrating a structure of a negative electrode plate of a known lithium ion secondary battery.
Figure 6:
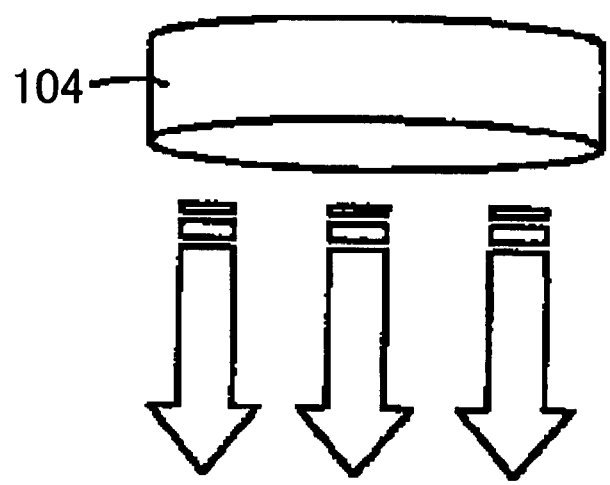
FIG. 6 is a cross-sectional view illustrating a structure of a negative electrode plate for the known lithium ion secondary plate.
Figure 6:
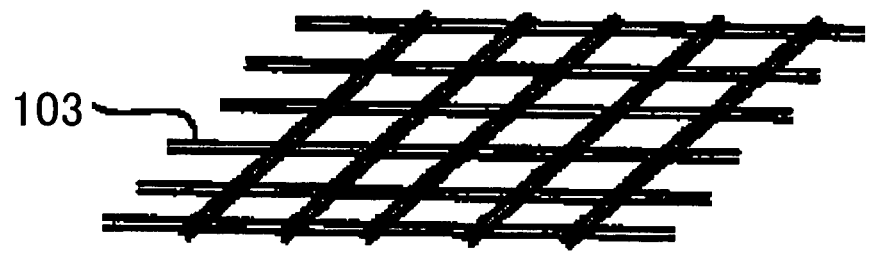
Figure 6:
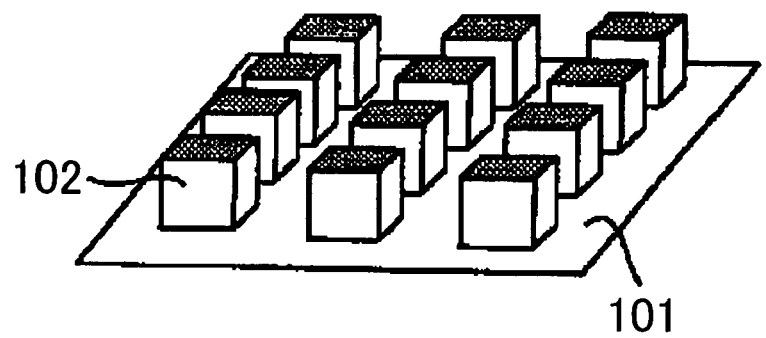

FIG. 5 is a cross-sectional view illustrating a structure of a lithium ion secondary battery 20 formed using the negative electrode plate 10 having the structure of FIG. 1 or FIG. 3.

As shown in FIG. 5, an electrode group including a positive electrode plate 21 and a negative electrode plate 22 (having the structure of FIG. 1 or FIG. 3) spirally wound with a separator 23 interposed between the positive electrode plate 21 and the negative electrode plate 22 is stored with an electrolyte in a battery case 24. One end of the positive electrode plate 21 is connected to a current collector plate 26 via a positive electrode lead 25 and is further connected to a sealing plate 27 serving also as a positive terminal via the current collector plate 26. One end of the negative electrode plate 22 is connected to the battery case 24 serving also as a negative terminal via a negative electrode lead 28. An opening end portion of the battery case 24 is sealed by caulking it with the sealing plate 27 with a gasket 29 interposed between the sealing plate 27 and the battery case 24.

In the description of this embodiment, preferable materials for the active material of the negative electrode, formed in form of the island regions 12, the conductive protective film 13 covering the active material and the conductive adhesive film 14 formed under the island regions 12 have been described. However, as a matter of course, materials for those components are not limited to the described materials, but various materials can be properly selected.

Hereafter, typical examples of materials for each component of the lithium ion secondary battery according to this embodiment will be described.

As a current collector used for a positive electrode, for example, aluminum, carbon, conductive resin and the like can be used. Also, a surface of a current collector may be coated by carbon or the like.

As a current collector used for a negative electrode, for example, metal foil such as stainless steel, nickel, copper, titanium or the like, a thin film of carbon or conductive resin, or the like can be used. Also, a surface of the current collector may be coated by carbon, nickel, titanium or the like.

As an active material of a positive electrode, lithium composite metal oxide can be used. For example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMePO_4$, $Li_2MePO_4F$ (M is at least one selected from the group consisting of Na, Mg, Sc, Y, Mn, Fe, Co, Ni, Cu, Zn, Al, Cr, Pb, Sb and B) can be used. In this case, x=0-0.2, y=0-0.9 and z=2.0-2.3. As the x value indicating the molar ratio of lithium, a value obtained immediately after formation of the active material is used and the x value is increased/reduced due to charge/discharge. Furthermore, part of a compound containing lithium may be replaced with a different type element. Moreover, a surface of the active material may be coated by metal oxide, lithium oxide, a conducting agent or the like or may be hydrophobized.

As an active material of a negative electrode, in addition to the above-described materials, for example, Si, Sn, Ge, oxide or alloy of Si, Sn and Ge, or the like can be used. As the negative electrode active material, one of the above-described materials may be independently used or combination of two or more of the above-described materials may be used.

As a conductive protective film, in addition to the above-described materials, for example, carbon black (CB), carbon nanofiber (CNF) or the like may be used.

As a binder contained in a conductive protective file, in addition to the above-described materials, polytetrafluoroethylene, polyethylene, aramid resin, polyamide, polyimide, polyamide imide, polyacrylnitrile, polyacrylic acid methyl ester, polyacrylic acid ethyl ester, polyacrylic acid hexylester, polymethacrylic acid, polymethacrylic acid methyl ester, polymethacrylic acid ethyl ester, polymethacrylic acid hexylethyl ester, polyvinyl acetate, polyvinyl pyrrolidone, polyether, polyether sulfone, hexafluoropolypropylene, styrenebutadiene rubber, carboxymethyl cellulose, or the like can be used. Moreover, copolymer of two or more selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid and hexadiene may be used. Also, mixture of two or more selected from the group of the above-described materials may be used.

As a separator, a microporous thin film, woven fabric, nonwoven fabric or the like which has large ion transmittance, predetermined mechanical strength and insulating property is used. Polyolefin such as polypropylene, polyethylene and the like is excellent in durability and has the shutdown function. Therefore, polyolefin is preferable in terms of safety of lithium ion secondary battery. A separator generally has a thickness of 10-300 μm, but preferably has a thickness of 40 μm or less. The range of thickness of a separator is more preferably 5-30 μm and further more preferably 10-25 μm. A microporous thin film may be a single-layer film including a single type material and also may be a composite or multilayer film including two or more types of materials. A porous ratio of a separator is preferably in the range of 30-70%. Herein, porous ratio means the occupation ratio of area of porous portions to a surface area of a separator. A more preferable range of porous ratio of a separator is 30-60%.

As a nonaqueous electrolyte, a material in form of liquid, gel, or solid (polymer solid electrolyte) can be used.

A nonaqueous electrolyte can be obtained by dissolving an electrolyte (for example, lithium salt) with nonaqueous medium. A gel nonaqueous electrolyte includes a nonaqueous electrolyte and a polymer material in which the nonaqueous electrolyte is retained. As a polymer material, polyvinylidene fluoride, polyacrylonitrile, polyethylene oxide, polyvinyl chloride, polyacrylate, polyvynilidene fluoride hexafluoropropylene or the like is preferably used.

As a nonaqueous medium, cyclic carbonate, chain carbonate, cyclic carboxylate ester, or the like is used. As cyclic carbonate, propylene carbonate (PC), ethylene carbonate (EC), or the like can be used. As chain carbonate, diethyl carbonate (DEC), ethyl methyl carbonate (EMC), dimethyl carbonate (DMC) or the like can be used. As cyclic carboxylate ester, γ-butyrolactone (GBL), γ-valerolactone, or the like can be used. As the nonaqueous medium, one of the above-described materials may be independently used or combination of two or more of the above-described materials may be used.

As a material to be dissolved with a nonaqueous medium, $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, low aliphatic lithium carboxylate, LiCl, LiBr, LiI, chloroborane lithium, borate salt, imide salt or the like can be used. As borate salt, bis(1,2-benzenediolate(2-)-o,o') lithium borate, bis(2,3-naphthalene diolate(2-)-O,O') lithium borate, bis(2,2'-biphenyldiolate(2-)-O,O') lithium borate, bis(5-fluoro-2-olate-1-benzenesulfone acid-o,o') lithium borate, or the like can be used. As imide salt, bistrifluoromethanesulfonic acid imide lithium (($CF_3SO_2)_2NLi$), trifluoromethanesulfonic acid nonafluorobutansulfonic acid imide lithium ($LiN(CF_3SO_2)(C_4F_9SO_2)$), bispentafluoroethanesulfonic acid imide lithium (($C_2F_5SO_2)_2NLi$), or the like can be used. As a material to be dissolved, one of the above-described materials may be independently used or combination of two or more of the above-described materials may be used.

A nonaqueous electrode may include a material which is discomposed as an additive on a negative electrode to form a coating film with high lithium ion conductivity and increase coulombic efficiency. As an additive having the above-described function, for example, vinylene carbonate (VC), 3-methylvynilene carbonate, 3,4-dimethylvinylene carbonate, 3-ethylvinylene carbonate, 3,4-diethylvinylene carbonate, 3-propylvinylene carbonate, 3,4-dipropylvinylene carbonate, 3-phenylvinylene carbonate, 3,4-diphenylvinylene carbonate, vinylethylene carbonate (VEC), divinylethylene carbonate, or the like can be used. Each of these materials may be independently used or combination of two or more of the materials may be used. Among the above-described materials, at least one selected from the group consisting of vinylene carbonate, vinylethylene carbonate and divinylethylene carbonate is preferable. As for the above-described compounds, part of hydrogen atoms may be replaced with fluorine atoms. An amount of dissolved electrolyte with respect to nonaqueous medium is desirably in the range of 0.5-2 mol/L.

A nonaqueous electrolyte may include a benzene derivative which is dissolved at overcharge to form a coating film on an electrode and deactivate a battery. As a benzene derivative, a phenyl group or a material including a cyclic compound group adjacent to the phenyl group is preferable. As a cyclic compound group, a phenyl group, a cyclic ether group, a cyclic ester group, a cycloalkyl group, a phenoxy group or the like is preferable. As specific examples of benzene derivatives, cyclohexylbenzene, biphenyl, diphenyl ether, or the like can be used. Each of these materials may be independently used or combination of two or more of the materials may be used. A benzene derivative content is preferably 10 percent by volume or less of an entire nonaqueous medium.

Hereafter, specific working examples of the lithium ion secondary battery according to the present invention will be described.

WORKING EXAMPLE 1

(1) Forming of Negative Electrode Plate

As a negative active material, SiO (i.e., silicon monoxide powder with a particle diameter of 10 μm or less obtained through pulverization and classification in advance, which is available from Wako Pure Chemical Industries, LTD.) in 100 weight part and, as a conductive material, acetylene black in 5 weight part were dry mixed. Next, PVDF in 10 weight part in terms of solid content and N methyl 2 pyrolidone were added thereto and wet mixed, thereby preparing a negative active material slurry in paste form. The slurry was gravure applied on both surfaces of a current collector made of a copper foil having a thickness of 15 μm and dried, thereby forming an active material layer in form of islands.

Next, acetylene black in 100 weight part, polyacrylic acid in 5 weight part in terms of solid content and water were added thereto and dispersed by a homagenizer, thereby preparing a conductive material slurry. The slurry was spray applied onto the active material layer, thereby forming a conductive protective film 13 so as to have a thickness of 2 μm. Thereafter, the current collector was cut so as to have predetermined dimensions and a nickel lead was attached to exposed part of the current collector by ultrasonic welding. Thus, a negative electrode plate was obtained.

(2) Forming of Positive Electrode Plate

Acetylene black in 5 weight part as a conducting agent and polyvinylidene fluoride resin in 10 weight part as a binder were mixed with cobalt acid lithium powder in 85 weight part and the obtained mixture was dispersed by dehydrated N-methyl-2-pyrrolidone, thereby preparing a positive mixture in slurry form. The positive mixture was applied onto both surfaces of a positive current collector made of an aluminum foil, dried, rolled and cut so as to have predetermined dimensions. Thus, a positive electrode plate was obtained.

(3) Preparation of Nonaqueous Electrolyte

One wt % vinylene carbonate was added to a mixture medium of ethylene carbonate and ethyl methyl carbonate in a volume ratio of 1:3 and $LiPF_6$ was dissolved with the mixture medium at a concentration of 1.0 mol/L. Thus, a non-aqueous electrolyte was obtained.

(4) Formation of Cylindrical Battery

An aluminum positive electrode lead and a nickel negative electrode lead were attached to current collectors of the positive electrode plate and the negative electrode plate, respectively, and then the positive electrode plate and the negative electrode plate were spirally wound with a separator interposed between the positive electrode plate and the negative electrode plate. Thus, an electrode group was formed. An insulating plate was provided in each of top and bottom parts of the electrode group. Also, the negative electrode lead was welded to a battery case and the positive electrode lead was welded to a sealing plate having an internal pressure operating safety valve, and then the electrode group was stored in the battery case. Thereafter, the nonaqueous electrolyte was injected into the battery case by reducing pressure. Lastly, an opening end portion of the battery case was caulked with the sealing plate with a gasket interposed between the sealing plate and the battery case to complete a battery A. The capacity of the obtained cylindrical battery was 2000 mAh.

WORKING EXAMPLE 2

A battery B was produced in the same manner as in Working Example 1 except that Si (silicon powder which is available from Wako Pure Chemical Industries, LTD.) was used as a negative electrode active material.

WORKING EXAMPLE 3

A battery C was produced in the same manner as in Working Example 1 except that Ti—Si was used as a negative electrode active material. Ti—Si was formed by the following manner.

Titanium powder (of which a particle diameter is 150 µm or less and which is available from Kojundo Chemical Laboratory Co., LTD.) in 50 weight part and silicon powder (available from Wako Pure Chemical Industries, LTD.) in 100 weight part were mixed and the obtained mixture of 3.5 kg was loaded into a vibration mill. Stainless steel balls each having a diameter 2 cm were loaded so that a total volume of the stainless balls be 70% of a volume of the mill and mechanical alloying was performed in an argon gas atmosphere for 80 hours. Thus, Ti—Si alloy was obtained.

As a result of observation of the obtained Ti—Si alloy using ERD and TEM, it was found that a noncrystalline phase, a microcrystalline Si phase in which a crystal particle diameter is approximately 10-20 nm and a similar $TiSi_2$ phase existed. If it is assumed that the Ti—Si alloy was formed of only Si and $TiSi_2$, the weight ratio of Si:$TiSi_2$ was approximately 30:70.

WORKING EXAMPLE 4

A battery C was produced in the same manner as in Working Example 1 except that $SnO_2$ (i.e., tin oxide powder available from Kanto Chemical Co., INC.) was used as a negative electrode active material.

WORKING EXAMPLE 5

An active material of the negative electrode plate was formed by vacuum vapor deposition. Si (scrap silicon having a purity of 99.999%) as a vapor source was loaded into a crucible and used as a vapor source. The internal pressure of a vacuum vessel was reduced to $10^{-4}$ Pa and argon was fed into the vessel to obtain an argon atmosphere of 3.5 Pa. In vapor deposition, electrical beam generated by an electrical beam generator was polarized by a polarizing yoke to irradiate the electrical beam to the vapor source, thereby evaporating the vapor source. Thus, an active material layer was formed on the current collector masked using a SUS mesh (250 mesh) at a film formation rate of about 2 nm/s. The obtained active material was hardly deposited on parts of the current collector corresponding to a mesh frame, so that Si was compartmentalized.

A battery E was produced in the same manner as in Working Example 1 except for that the active material layer was formed in the above-described method.

WORKING EXAMPLE 6

Before forming the negative electrode active material on the current collector, using a paste of the same material as the material of the conductive protective film 13 in Working Example 1 was spray applied to the current collector, thereby forming a conductive adhesive film 14 so as to have a thickness of 2 µm. Thereafter, a battery F was produced by the same method as in the working Example 1.

COMPARATIVE EXAMPLE 1

A battery G was produced in the same manner as in Working Example 1 except that the conductive protective film 13 was not formed.

COMPARATIVE EXAMPLE 2

A battery H was produced in the same manner as in Working Example 2 except that the conductive protective film 13 was not formed.

COMPARATIVE EXAMPLE 3

A negative electrode active material slurry was prepared in the same manner as in Working Example 1. Then, a battery I was produced in the same manner as in Working Example 1 except that and the slurry was applied to both surfaces of the current collector made of a copper foil having a thickness of 15 µm by the doctor blade method and dried to form an active material layer (which was not compartmentalized in form of islands).

COMPARATIVE EXAMPLE 4

A battery J was produced in the same manner as in Working Example 5 except that the conductive protective film 13 was not formed.

(Property Evaluations for Battery A Through J)

Using the batteries A through J produced in the above-described manner, high rate property and lifetime property were measured by the following method.

(High Rate Property)

Each of the batteries A through J was set at an environmental temperature of 25° C. and CC-CV charge (constant current-constant voltage charge) was performed in which each battery was first charged with a constant current of 1400 mA until a battery voltage reached 4.2 V and then a current of each battery was attenuated to a current value of 100 mA by a current voltage of 4.2 V. After a 30 minute recess, discharge was performed with a current of 400 mA until the battery voltage reached 3.0 V. This discharge capacity was regarded as 0.2 C discharge capacity.

Next, each of the batteries was charged in the same manner as described above and then was discharged with a constant current of 2000 mA until the battery voltage was reduced to 3.0 V. This discharge capacity was regarded as 2 C discharge capacity.

High rate property was indicated by a value expressing the ratio of 2 C discharge capacity to 0.2 C discharge capacity in percentage.

(Lifetime Property)

Each of the batteries A through J was set at an environmental temperature of 25° C. and CC-CV charge (constant current-constant voltage charge) was performed in which each battery was first charged with a constant current of 1400 mA until a battery voltage reached 4.2 V and then a current of each battery was attenuated to a current value of 100 mA by a current voltage of 4.2 V. Thereafter, discharge was performed with a current of 2000 mA until the battery voltage reached 3.0 V.

The above-described discharge was repeated for 100 cycles. Assuming a discharge capacity at the third cycle to be 100%, a capacity maintenance rate after 100 cycles was calculated for each of the batteries to indicate lifetime property.

Table 1 shows results with respect to high rate property and lifetime property for each of the batteries A through J.

TABLE 1

| | Batteries | Negative electrode active material | Method for forming negative electrode active material | Negative electrode plate structure | High rate property [%] | Lifetime property [%] |
|---|---|---|---|---|---|---|
| Working Example 1 | Battery A | SiO | Application | FIG. 1 | 93 | 85 |
| Working Example 2 | Battery B | Si | ↑ | ↑ | 94 | 80 |
| Working Example 3 | Battery C | Ti—Si | ↑ | ↑ | 93 | 84 |
| Working Example 4 | Battery D | SnO$_2$ | ↑ | ↑ | 90 | 81 |
| Working Example 5 | Battery E | Si | Vapor deposition | ↑ | 95 | 88 |
| Working Example 6 | Battery F | SiO | Application | FIG. 3 | 92 | 87 |
| Comparative Example 1 | Battery G | SiO | Application | | 95 | 71 |
| Comparative Example 2 | Battery H | Si | Application | | 76 | 38 |
| Comparative Example 3 | Battery I | SiO | ↑ | | 71 | 12 |
| Comparative Example 4 | Battery J | Si | Vapor deposition | | 86 | 55 |

As shown in Table 1, it can be understood that the batteries A through F are excellent in high rate property and lifetime property, compared to the batteries G through J. Specifically, even in the case where the active material of the negative electrode is formed on the current collector by applying the material, substantially the same properties can be obtained as those in the case where it is formed by vapor deposition. This confirms effects of covering the active material in form of islands by the conductive protective film.

The present invention has been described above using preferred embodiments. However, the above description does not limit the present invention and, as a matter of course, various modifications are possible.

What is claimed is:

1. A lithium ion secondary battery in which an active material of a negative electrode is made of a material having a characteristic of alloying with lithium, wherein an active material layer is formed on a current collector of the negative electrode in the form of a plurality of island regions so that the island regions are separated from one another and a conductive protective film is formed on the current collector so as to completely cover the plurality of island regions and so as to cover regions of the current collector on which the island regions are not formed.

2. The lithium ion secondary battery of claim 1, wherein the active material of the negative electrode is made of silicon, tin or a compound containing silicon or tin.

3. The lithium ion secondary battery of claim 1, wherein the conductive protective film is made of a film having an aggregation structure.

4. The lithium ion secondary battery of claim 3, wherein the conductive protective film is made of conductive carbon black.

5. The lithium ion secondary battery of claim 1, wherein the conductive protective film includes a binder.

6. The lithium ion secondary battery of claim 1, wherein the active material is formed on the current collector with a conductive adhesive film provided on the current collector and interposed between the active material and the current collector.

7. A method for forming a negative electrode plate for a lithium ion secondary battery, the method comprising the steps of:

a) forming on a current collector an active material layer made of a material having a characteristic of alloying with lithium in the form of a plurality of island region so that the plurality of island regions are separated from one another; and b) forming a conductive protective film on the current collector so that the conductive protective film completely covers the island regions and regions of the current collector on which the island regions are not formed.

8. The method of claim 7, wherein the active material is made of silicon, tin or a compound containing silicon or tin.

9. The method of claim 7, wherein in the step a), the island regions of the active material are formed by applying a slurry containing the active material onto the current collector through gravure application.

10. The method of claim 7, wherein the conductive protective film is made of conductive carbon black.

11. The method of claim 7, further comprising, before the step a), the step c) of forming a conductive adhesive film on the current collector.

* * * * *